United States Patent [19]

Uwatoko et al.

[11] Patent Number: 5,777,669
[45] Date of Patent: Jul. 7, 1998

[54] IMAGE READING DEVICE

[75] Inventors: Koki Uwatoko; Hiroyuki Miyake, both of Kanagawa, Japan

[73] Assignee: Fuji Xerox Co., Ltd., Tokyo, Japan

[21] Appl. No.: 607,106

[22] Filed: Feb. 26, 1996

Related U.S. Application Data

[63] Continuation of Ser. No. 198,813, Feb. 18, 1994, abandoned.

[30] Foreign Application Priority Data

Feb. 19, 1993 [JP] Japan ................... 5-053210

[51] Int. Cl.$^6$ .................................................. H04N 5/335
[52] U.S. Cl. ...................... 348/308; 348/311; 358/482; 250/208.1
[58] Field of Search ........................ 348/304, 307, 348/308, 311, 313, 317, 297, 908, 301, 302, 310; 358/448, 482, 483; 257/292, 340, 351; 250/208.1

[56] References Cited

U.S. PATENT DOCUMENTS

| | | | |
|---|---|---|---|
| 4,589,026 | 5/1986 | Ozawa et al. | 358/483 |
| 4,672,453 | 6/1987 | Sakamoto | 358/483 |
| 4,762,398 | 8/1988 | Yasui et al. | 359/59 |
| 4,827,345 | 5/1989 | Nakagawa et al. | 358/482 |
| 4,896,216 | 1/1990 | Brunst et al. | 358/482 |
| 5,124,544 | 6/1992 | Ohzo | 348/297 |
| 5,285,302 | 2/1994 | Wu | 359/59 |

FOREIGN PATENT DOCUMENTS

| | | | |
|---|---|---|---|
| 1-94655 | 4/1989 | Japan | H01L 27/14 |
| 2-265362 | 10/1990 | Japan | H04N 1/28 |
| 3-79910 | 12/1991 | Japan | H01L 27/14 |
| 4-77171 | 3/1992 | Japan | H04N 1/28 |

OTHER PUBLICATIONS

Kyomasu—A New MOS Imager Using Photodiode as Current Source—IEEE Jour. of Solid State Electronics; vol. 26 No. 8 Aug. 1991.

*Primary Examiner*—Andrew I. Faile
*Assistant Examiner*—Andrew B. Christensen
*Attorney, Agent, or Firm*—Finnegan, Henderson, Farabow, Garrett & Dunner, L.L.P.

[57] ABSTRACT

An image reader device comprises photo sensing element arrays each of a plural number of blocks each consisting of a plural bits of photo sensing elements, a plural number of first switching elements, connected to the photo sensing elements, for transferring en bloc the charge of all bits generated in the photo sensing element array, a plural number of second switching elements, connected to the photo sensing elements, for resetting en bloc the charge of all bits left in the photo sensing elements after the charge transfer, a plural number of capacitor portions, connected to the first switching elements, for retaining the transferred charge, a plural number of third switching elements, connected to the first switching elements, for transferring the charge stored in the capacitor portions, a plural number of wiring capacitor portions, formed connecting to the third switching elements, for retaining the charge transferred by the third switching elements, common signal lines for connecting the third switching elements every corresponding bits in the blocks, and drive ICs for receiving the charge through the common signal lines and outputting it in the form of image signals.

7 Claims, 10 Drawing Sheets

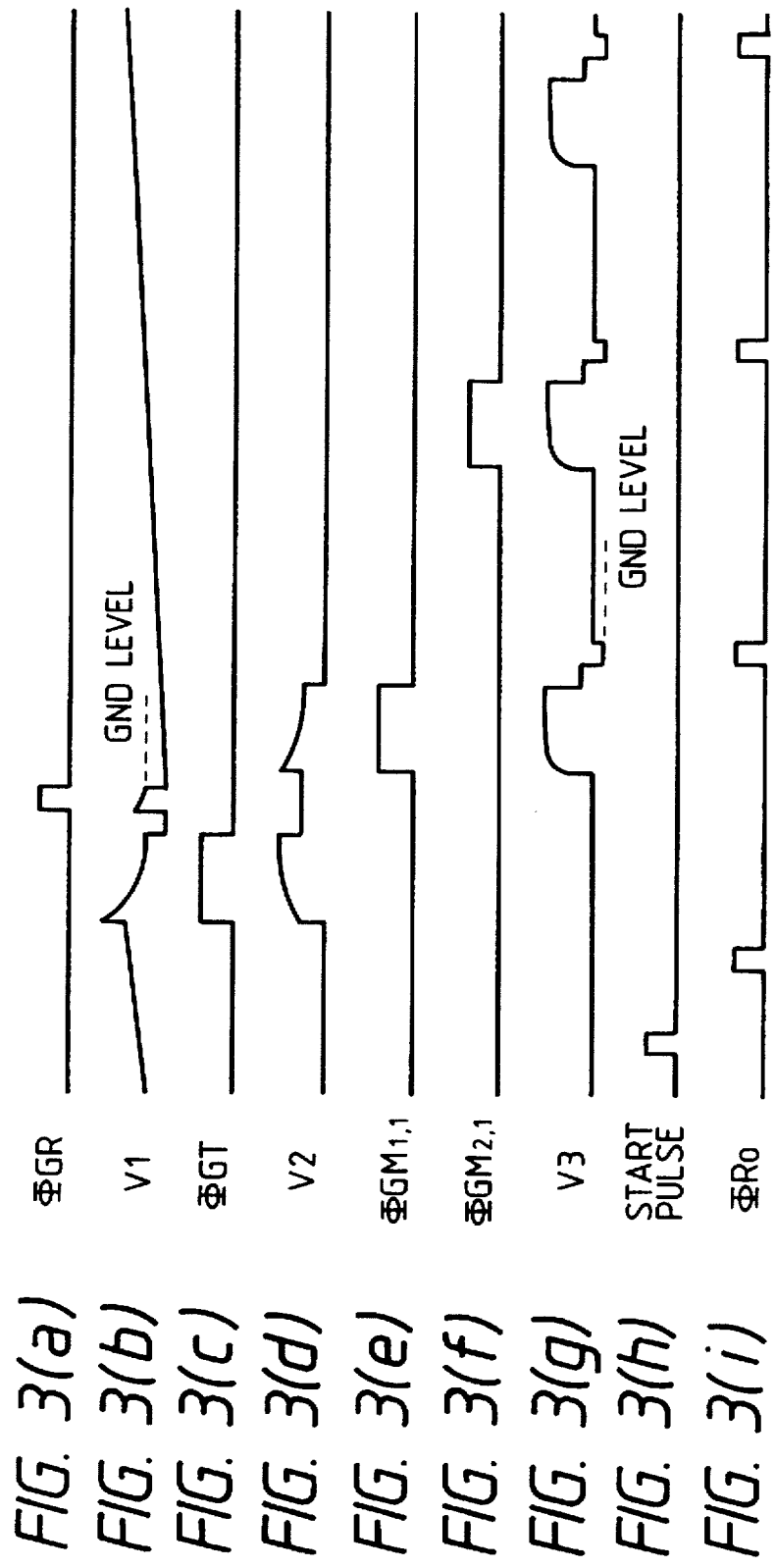

FIG. 6

| | $C_{GD}(T1)$ (pF) | | | $\Delta V1$ (mV) | $\Delta V2$ (mV) |
|---|---|---|---|---|---|
| | 0.065 | 0.085 (NO MIS-ALIGNMENT) | 0.105 | | |
| OUTPUT VARIATION (mV) FOR TYPE 1 | 20.3 (mV) | 2.2 (mV) | 26.0 (mV) | −22.5 | +23.8 |
| OUTPUT VARIATION (mV) FOR TYPE 2 | 16.6 (mV) | 2.2 (mV) | −12.2 (mV) | +14.4 | −14.4 |
| OUTPUT VARIATION (mV) FOR TYPE 3 | −14.5 (mV) | 2.2 (mV) | 17.9 (mV) | −16.7 | +15.7 |
| OUTPUT VARIATION (mV) FOR TYPE 4 | −51.2 (mV) | 2.2 (mV) | 56.1 (mV) | −53.4 | +53.9 |

LAYOUT OF TYPE 1

LAYOUT OF TYPE 2

LAYOUT OF TYPE 3

LAYOUT OF TYPE 4

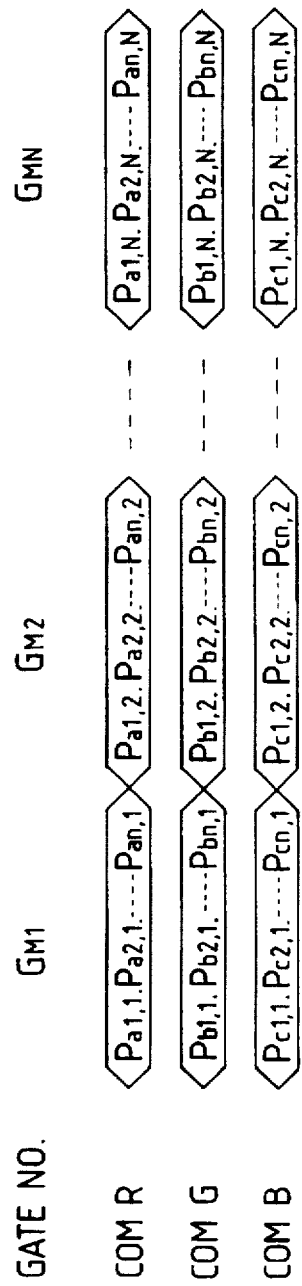
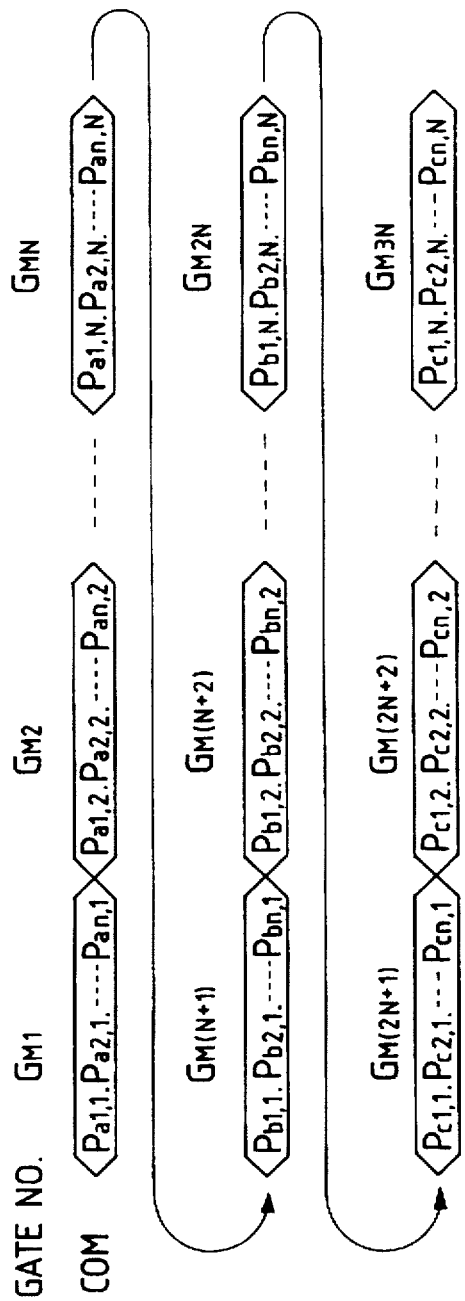
FIG. 9(a)
FIG. 9(b)

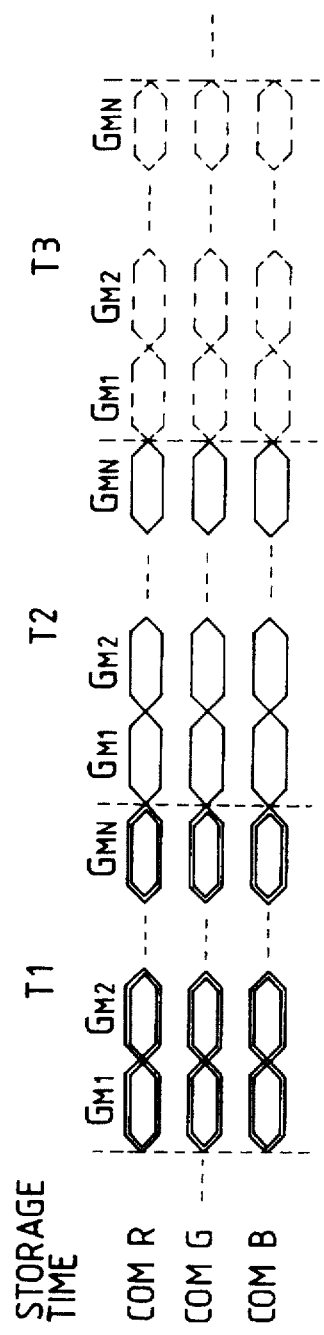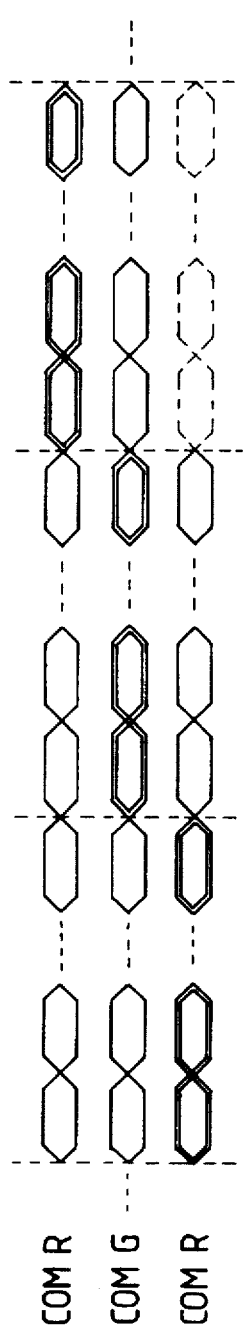

5,777,669

1
IMAGE READING DEVICE

This application is a continuation of application Ser. No. 08/198,813 filed Feb. 18, 1994, now abandoned.

BACKGROUND OF THE INVENTION

The present invention relates to an image reading device in use with an image input apparatus, such as a facsimile machine and a scanner, and a method of reading an image. More particularly, the invention relates to an image reading device (thin film transistor TFT drive image sensor) of the type in which photo sensing elements linearly arrayed in the fast scan direction are grouped into blocks, each photo sensing element is coupled with thin film transistor (TFT) associated therewith, and the output signals from the photo sensing elements are read block by block in a matrix drive manner, the image reading device being improved in that the read-position shift in the slow scan direction possibly caused in the block-basis image reading operation is removed.

The conventional contact image sensor uses a long photo sensing element array of which the length is substantially equal to the width of an original document. The contact image sensor receives light reflected by the photo sensing element array, through a rod lens array. Those arrayed photo sensing elements converts the optical image information on the document into electrical image signals.

In this type of the image sensor, charges generated by the photo sensing elements are transferred every block by TFTs, through a matrix wiring to storage capacitors. The charges are temporarily stored in the storage capacitors. A sensing circuit reads the charges out of the storage capacitors in a time sequential manner. One drive IC can read the image information of one line. This TFT image sensor is advantageous in reduction of cost to manufacture.

A typical example of the TFT drive image sensor is shown in FIG. 8. As shown, the TFT drive image sensor is comprised of a photo sensing element array 50 in which a plural number of photo sensing elements P are arrayed at a uniform density over the range substantially equal to the width of an original document, a TFT (thin film transistor) array 51 consisting of TFTs each coupled with the photo sensing element associated therewith, a drive IC 52 for sensing charges generated in the photo sensing elements P, and interconnection wires 53 for connecting the thin film transistors T and the drive IC 52 in a matrix fashion. The photo sensing element array 50 includes an (n×K) number of photo sensing elements P where n indicates the number of photo sensing elements forming one block, and K indicates the number of blocks. The photo sensing elements P are connected to the drain electrodes of the transistors T, respectively. The source electrodes of the n number of transistors T, which form one block, are connected to the drive IC 52 for sensing image signals. The gate electrodes of the transistors T are connected to gate drive lines G1 to Gk every block.

Each of the photo sensing elements P is a photo diode which is reversely biased by a positive voltage VB applied to the cathode thereof. When the photo sensing element array 50 receives light reflected from the surface of the document, hole-electron pairs generated therein by incident light during the period of storage are stored as charges in the capacitors defined by the equivalent capacitance of the photo sensing elements P and the capacitors defined by the overlap capacitance between the gate and drain of each of the thin film transistors T. A pulse is applied to the gate drive line G1 coupled with the thin film transistors T. In response to the pulse, the thin film transistors T are rendered conductive. The charge of n bits at the drains of the thin film transistors T ($T_{1,1}$ to $T_{1,n}$) are transferred to the wire capacitors defined by wire capacitance CL. The stored charges vary the potential on common signal lines 54 connecting to the drive IC 52. The potentials are sensed by the voltage follower amplifiers in the drive IC 52, and time sequentially output to an output line 55 by an analog multiplexer contained in the drive IC. Subsequently, pulse signals are applied to the gate drive lines G2 to Gk, and turn on the thin film transistors T associated therewith every block. The above sequence of operations is repeated. The image signals of (n×K) bits of the photo sensing element array 50 are time sequentially read out (in the fast scan direction). Then, an original document is moved (in the slow scan direction) by a document feed means (not shown), such as a roller. This sequence of the operations is repeated to read an image out of the entire surface of the document (Reference is made to Published Unexamined Japanese Patent Application No. Hei. 2-26532, for example.).

In the TFT drive image sensor thus constructed and operated, the image is read out of the document in the fast scan direction. Then, the paper feed means moves the document relative to the photo sensing element array in the slow scan direction. During the period of storing the charges caused by the reflecting light in each block, the document is shifted to another position. In other words, the sampling timing of the image signal is shifted every pixel. Accordingly, the pixel positions corresponding to the read-out signals become different in the slow scan direction. The resultant image suffers from the read-position shift.

Another problem of the conventional TFT drive image sensor follows. In the conventional image sensor, since the image signals are sequentially read out every block, the corresponding pixel positions in each block are connected by the common signal lines. Accordingly, the signal lines are generally multi-layered in a matrix fashion. Because of the matrix multi-layer of the signal lines, a so-called cross-talk tends to occur among the signal lines. The resultant image signals are abnormal.

In a conventional image sensor, a plural number of lines of photo sensing element arrays are coupled with switching elements, respectively. Color filters are disposed on the photo sensing element arrays. The lines of the photo sensing element arrays read the image at specific wave lengths of light. The photo sensing elements of the colors for reading the same location of the image in the fast scan direction are located every several pitches of pixels in the slow scan direction. The charges are sequentially stored and transferred in each block. When the document is moved, the document position is shifted by a distance corresponding to the time of storing the charge in each block. The resultant color image suffers from an inexact superposition of colors.

SUMMARY OF THE INVENTION

The present invention has been made in view of the above circumstances and has an object to provide an image reading device which is free from such problems as the read-position shift and the inexact superposition of colors.

Another object of the present invention is to provide an image reading method which is also free from such problems as the read-position shift and the inexact superposition of colors.

To achieve the above objects, there is provided an image reader device comprising: photo sensing element arrays each of a plural number of blocks each consisting of a plural bits of photo sensing elements; a plural number of first switching elements, connected to the photo sensing elements, for transferring en bloc the charge of all bits generated in the photo sensing element array; a plural number of second switching elements, connected to the photo sensing elements, for resetting en bloc the charge of all bits left in the photo sensing elements after the charge transfer; a plural number of capacitor portions, connected to the first switching elements, for retaining the transferred charge; a plural number of third switching elements, connected to the first switching elements, for transferring the charge stored in the capacitor portions; a plural number of wiring capacitor portions, formed connecting to the third switching elements, for retaining the charge transferred by the third switching elements; common signal lines for connecting the third switching elements every corresponding bits in the blocks; and drive ICs for receiving the charge through the common signal lines and outputting it in the form of image signals.

In the image reader device, the first and second switching elements are preferably each a thin film transistor having a source electrode, a drain electrode, and a gate electrode, and the gate electrodes receive signals through the common signal lines every bits.

The photo sensing elements preferably receive a bias voltage from a common power supply wire every bits.

Further, in the image reader device, the first to third switching elements are thin film transistors, the first to third switching elements are substantially linearly arrayed, the source and drain electrodes of the thin film transistors as the first and second switching elements are disposed on one side of the gate electrodes, and the source and drain electrodes of the thin film transistors as the third switching elements are disposed on the other side.

An image reading method is provided for the image reader device thus constructed. In the image reading method, the third switching elements located at the same location in the blocks are successively driven by common gate control lines, the charge retained in the capacitor portions are transferred therefrom to the wiring capacitor portions in the order of first bits, second bits, . . . , in the blocks, and the charge is successively read by the drive ICs.

In the image reading method for the image reader device, the photo sensing element arrays are juxtaposed in the slow scan directions and color filters are disposed on the light receiving sides of the plural number of photo sensing element arrays, wherein the third switching elements connected to the photo sensing elements disposed at the same locations in the photo sensing element arrays are simultaneously rendered conductive, and the third switching elements are successively rendered conductive in the fast scan direction, whereby the output signals of the photo sensing elements at the same location in the fast scan direction are simultaneously produced.

In the image reader device of the invention, the charges generated in the photo sensing elements are transferred en bloc to the capacitor portions through the first switching elements. The charge transfer is carried out at the same timing for all the bits in the fast scan direction. The image reader device, unlike the conventional one, is free from the read-position shift.

The gate electrodes of the first and second switching elements simultaneously receive control signals through the same control line. Therefore, they receive the control signals at the same timing always.

An electric power is supplied to every group of the photo sensing elements, through the same power supply line.

There is eliminated the layout of a long power supply line, essential to the conventional image reader device. Therefore, it suffers from little drop of the power voltage.

The output variations due to the misalignment of the mask pattern in the TFT manufacturing stage are canceled out. This contributes to suppression of output variation.

The third switching elements are controlled so as to read out the charge from the photo sensing elements disposed at the same locations in the blocks. This eliminates the need of the matrix wiring structure, which is essential to the conventional device. No cross-talk is caused among the signal lines.

Unlike the conventional image reader device in which read signals are serially output for each color, all color signals of the photo sensing elements disposed at the same location in the fast scan direction are read out simultaneously. The readout time is reduced.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

FIGS. 3(a) to 3(i) are timing charts showing the operation of the image reading device shown in FIG. 1;

FIG. 6 is a table showing the results of a test for confirming how output variations of the thin film transistors, caused by variations of the overlap capacitance depend on the source/drain layout structures of thin film transistors;

FIGS. 9(a) and 9(b) are timing diagrams showing output signals from the photo sensing element array in the conventional image reading device and also an image reading device according to the present invention; and FIGS. 10(a) and 10(b) are explanatory diagrams for explaining the color registration due to the position shift of the photo sensing element array in the slow scan direction.

DETAILED DESCRIPTION OF THE PREFERRED EMBODIMENT

Figure 1:
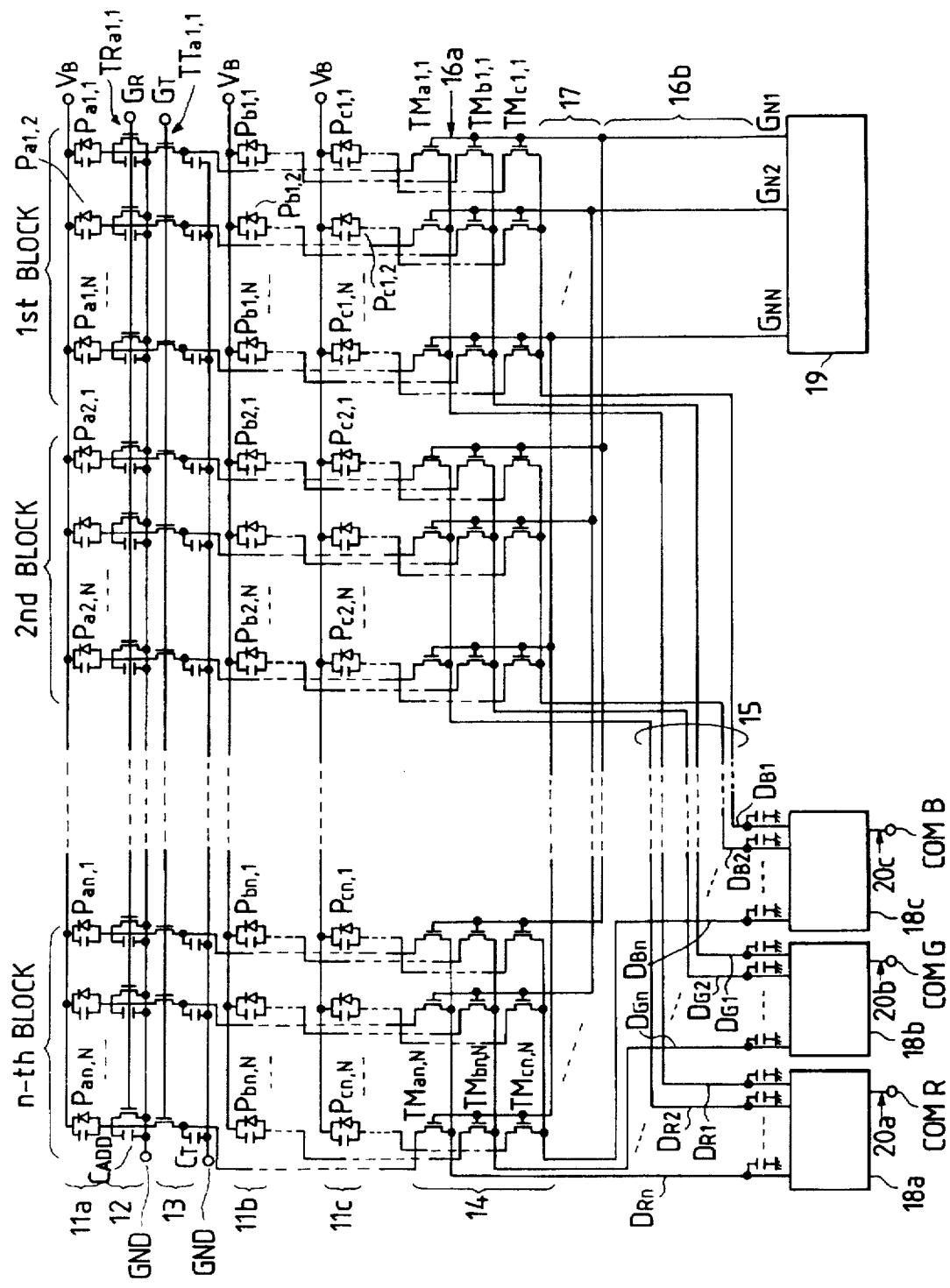
FIG. 1 is a circuit diagram showing an embodiment of an image reading device according to the present invention.
Figure 2:
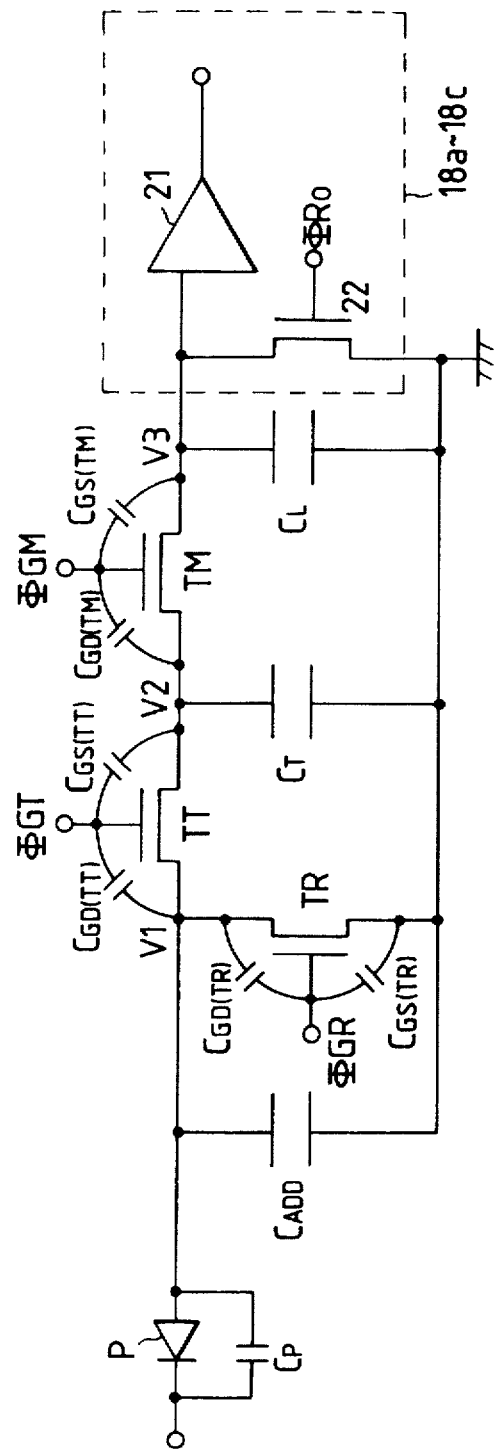
FIG. 2 is an equivalent circuit for each pixel in the embodiment of FIG. 1.
Figure 4A:
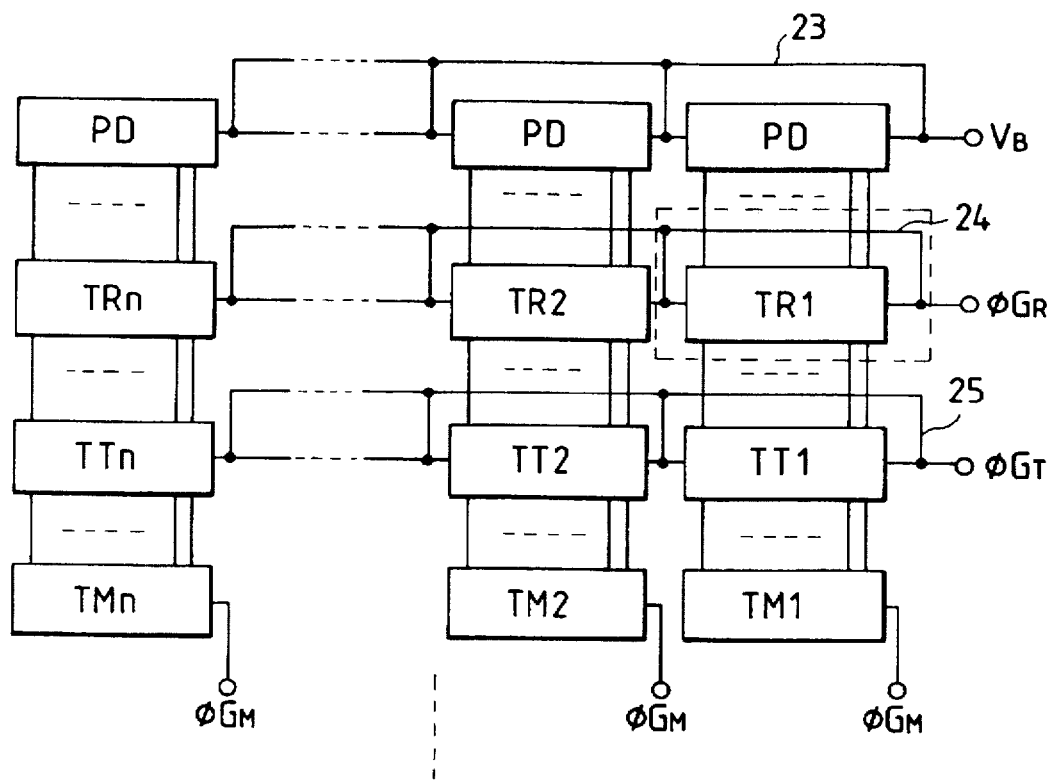
FIGS. 4(a), and 4(b) are plan views showing another wiring structure used for the image reading device.
Figure 4B:
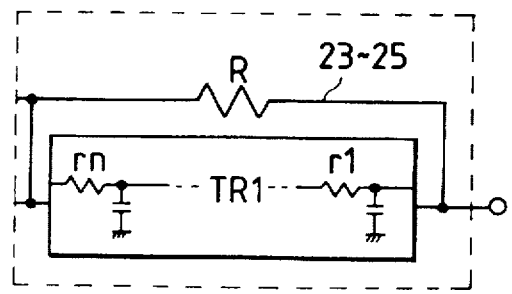
Figures 5A, 5B, 5C, 5D:
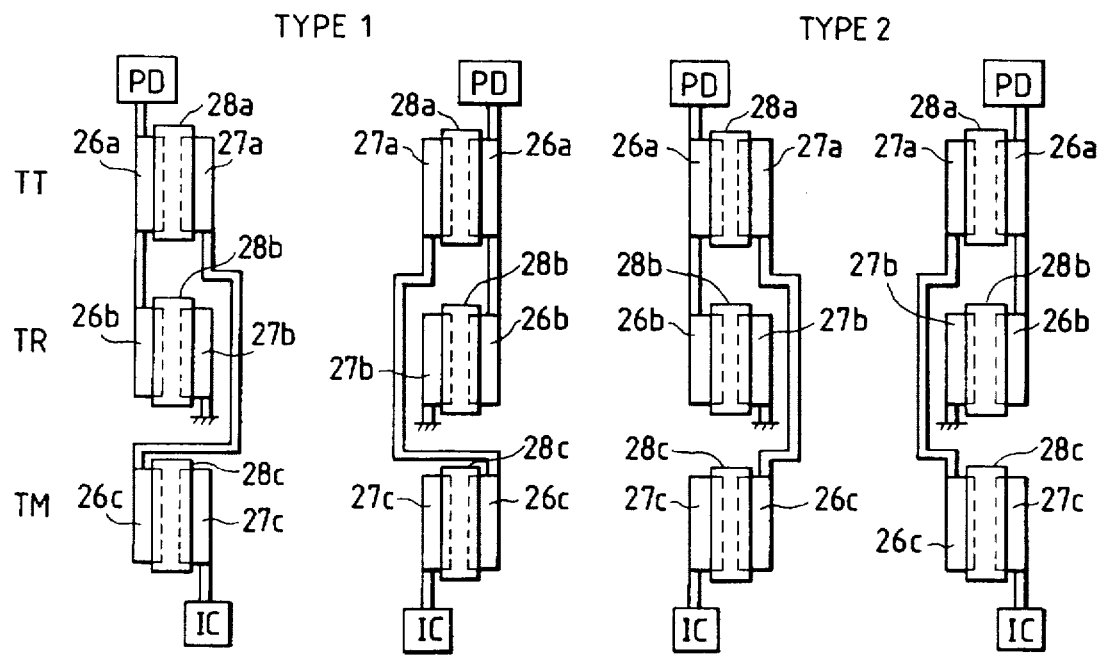
FIGS. 5(a) to 5(h) are plan views showing another layout structure of the thin film transistors used in the image reading device.
Figures 5E, 5F, 5G, 5H:
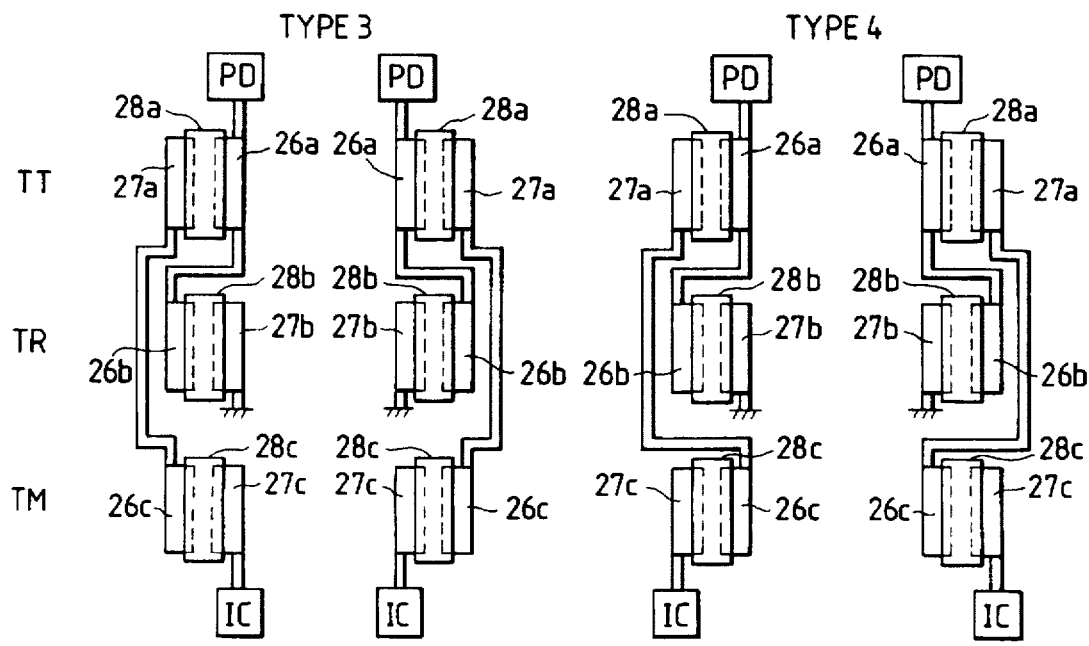

The preferred embodiment of an image reading device according to the present invention will be described with reference to FIGS. 1 through 7. FIG. 1 is a circuit diagram showing an embodiment of an image reading device according to the present invention. FIG. 2 is an equivalent circuit for each pixel in the embodiment of FIG. 1. FIG. 3 is a timing chart showing the operation of the image reading device shown in FIG. 1. FIG. 4 is a plan view showing another wiring structure used for the image reading device. FIG. 5 is a plan view showing another layout structure of the thin film transistors used in the image reading device. FIG. 6 is a table showing the results of a test for confirming how output variations caused by a variation of the overlap capacitance depend on the layout structures of thin film transistors. FIG. 7 shows sets of waveforms of a key portion in the image reading device, which are for explaining how output variations caused by a variation of the overlap capacitance depend on the layout structures of thin film transistors.

In the image reading device, an N number of photo sensing elements P, which make up one block, are juxtaposed on a substrate made of insulating material, such as glass. An n number of blocks form a photo sensing element array ($P_{1,1}$ to $P_{n,N}$). In this embodiment, three photo sensing element arrays 11a, 11a and 11c are arrayed in the slow scan direction of an original document. A filter allowing only red (R) light to pass therethrough is disposed on the photo sensing element array 11a; another filter allowing only green (G) light to pass therethrough, on the photo sensing element array 11b; and a further filter allowing only blue (B) light to pass therethrough, on the photo sensing element array 11c. Accordingly, the image reading device produces color image signals.

The photo diodes P are connected to a charge en bloc transfer section 13. The charge en bloc transfer section 13 includes thin film transistors TT provided respectively in association with the photo diodes P. One thin film transistor TT is connected in series to one photo diode. The photo diodes $P_{1,1}$ to $P_{n,N}$ are connected to a charge en bloc reset section 12. The charge en bloc reset section 12 includes thin film transistors TR provided respectively in association with photo diodes $P_{1,1}$ to $P_{n,N}$. In this embodiment, the thin film transistors TR are connected at the drains to the anodes of the photo diodes $P_{1,1}$ to $P_{n,N}$ and grounded at the sources.

The charge en bloc transfer section 13 is connected further to a charge transfer section 14. The charge transfer section 14 includes the same number of thin film transistors TM as that of the photo diodes $P_{1,1}$ to $P_{n,N}$. The sources of the thin film transistors TM in one block are connected to one another by a common signal line 15. The common signal lines 15 are connected to the drive ICs 18a, 18b, and 18c of three primary colors. The gate electrodes of the thin film transistors TM (forming the charge transfer section 14) of each block, which are located at the same pixel position in the fast scan direction (horizontal direction in FIG. 1), are interconnected by wires 16a. The corresponding wires 16a of the corresponding pixel positions in the blocks are connected, by a gate matrix section 17, into an N number of gate wires 16b, which are then connected to a gate driver circuit 19.

The drive ICs 18a, 18b, and 18c contain analog switches (not shown) which time sequentially select potentials on the n number of common signal lines, and output them to output lines 20a, 20b, and 20c.

Reference is made to FIGS. 2 and 3, there are illustrated an equivalent circuit for each pixel and a timing chart. The circuit arrangement for each pixel and the operation thereof will be described with reference to those figures. The photo diode P as a photo sensing element has a stray capacitance Cp. In the equivalent circuit, the stray capacitance Cp is expressed as a capacitor connected across the photo diode P, and also denoted as Cp. The anode of the photo diode P is connected in series to a thin film transistor TT for transferring charge en bloc and a thin film transistor TM for transferring charge sequentially. The source of the thin film transistor TM is connected to a charge sensing amplifier 21 of the drive ICs 18a to 18c. A additional capacitor $C_{ADD}$ and a charge reset thin film transistor TR are connected between the anode of the photo diode P and ground. An en bloc transfer capacitance CT is formed between a node between the en bloc transfer thin film transistor TT and the sequential transfer thin film transistor TM. A wiring capacitance CL is formed between the source of the sequential transfer thin film transistor TM and ground.

Within the drive ICs 18a to 18c, a reset MOS transistor 22 for resetting a wiring capacitor CL is inserted between the charge sensing amplifier 21 and ground.

In FIG. 2, $C_{GS}$ indicates an overlap capacitance $C_{GS}$ between the gate and source of the thin film transistor. $C_{GD}$ indicates an overlap capacitance between the gate and train of the thin film transistor. In the figure, the overlap capacitance $C_{GS}$ and $C_{GD}$ of those thin film transistors TT, TR, and TM are discriminated by attaching parenthesized TT, TR, and TM to those symbols $C_{GS}$ and $C_{GD}$. The thin film transistors TT, TR, and TM have the same static characteristics.

With such a construction, charges generated in the photo diode P is distributed into and stored in the stray capacitor Cp, the additional capacitor $C_{ADD}$, and the overlap capacitors $C_{GD(TT)}$ and $C_{GD(TR)}$ for a fixed period. A gate pulse $\phi$GT is applied to the gate of the thin film transistor TT. The transistor TT is rendered conductive. The charges is transferred from the stray capacitor Cp and the like to the en bloc transfer capacitance CT (waveforms (c) and (d) in FIG. 3). After the en bloc transfer thin film transistor TT is conductive, a gate pulse $\phi$GR is applied to the gate of the thin film transistors TR to be rendered conductive. As a result, the stray capacitor Cp, the additional capacitor $C_{ADD}$, and the overlap capacitors $C_{GD(TT)}$ and $C_{GD(TR)}$ are reset to purge the residual charge therefrom (waveforms (a) and (b) in FIG. 3).

Thereafter, a gate pulse $\phi$GM is applied to the gate of the sequential transfer thin film transistor TM, which in turn is rendered conductive. The charge stored in the en bloc transfer capacitance CT is read out thereof and stored into the wiring capacitance CL (waveforms (e) and (g) in FIG. 3). As the result of storing charge in the wiring capacitance CL, potential V3 on the signal line 15 connected to the drive ICs 18a, 18b, and 18c varies. After the sequential transfer thin film transistor TM is rendered nonconductive, the potential V3 is amplified by the charge sensing amplifier 21 within the drive ICs 18a, 18b, and 18c. The amplified potential is output to the output lines 20a, 20b, and 20c. Thereafter, the reset MOS transistor 22 is made conductive by a gate pulse $\phi$Ro applied thereto. The wiring capacitance CL is reset. After it is reset, the potential at the input of the charge sensing amplifier 21 is sensed as a reference potential by the charge sensing amplifier 21. The sensed potential is used as a reference potential when the image read signal is absent, in the signal processing circuit (not shown) connected to the image reading device.

The reason why the reset thin film transistors TR follows. A capacitance ratio of the stray capacitance Cp and the en bloc transfer capacitance CT is approximately expressed as Cp:CT=1:1 to 2. Accordingly, the residual potential in the photo diode P tends to be large. This must be reset. To this end, the transistor TR is provided. A ratio of the en bloc transfer capacitance CT and the wiring capacitance CL is approximately expressed as CT:CL=1:10. About 10% residual charge, less than that in the stray capacitor Cp, is still present. Accordingly, when the wiring capacitor CL is reset by rendering the reset MOS transistor 22 conductive, the sequential transfer thin film transistor TM is also rendered conductive, to reset the en bloc transfer capacitor CT.

The operation of the overall image reading device will be described with reference to FIGS. 1, 3, 9 and 10.

The basic operation of the image reading device will be described with reference to FIGS. 1 and 3. The timings of gathering pixel data of the colors R, G and B will be described with reference to FIGS. 9 and 10.

A start pulse (waveform (h) in FIG. 3) is applied from a circuit (not shown) to the gate driver circuit 19 and the drive ICs 18a, 18b, and 18c. During a fixed time period from the application of the start pulse, the photo diode P is put in a charge storage state. During this period, a gate pulse $\phi$Ro is input to the reset MOS transistor 22 in the drive ICs 18a, 18b, and 18c (waveform (i) in FIG. 3). The transistor 22 is conductive and the wiring capacitor CL is reset. The potential at the source of the sequential transfer thin film transistor TM, i.e., the potential at the input of the charge sensing amplifier 21, is set at the reference potential before the readout of charge from the photo diode P.

Then, a gate pulse $\phi$GT is applied to the gate of the en bloc transfer thin film transistor TT (waveform (c) of FIG. 3). The transistor TT is rendered conductive. The charge that has been stored in the stray capacitor Cp and the additional capacitor $C_{ADD}$ during the storage period of the photo diode P, is transferred from those capacitors to the en bloc transfer capacitor CT. The transfer of the stored charge in the photo diodes P of the respective colors are carried out concurrently. As the result of the charge transfer, a potential V2 at the node between the source of the en bloc transfer thin film transistor TT and the sequential transfer thin film transistor TM rises as shown in FIG. 3(waveform (d)) in accordance with the amount of the transferred charge.

After the charge transfer to the en bloc transfer capacitor CT, a gate pulse $\phi$GT is applied to the gate of the thin film transistors TR. The thin film transistors TR is put in a conductive state. As a result, the stray capacitor Cp and the additional capacitor $C_{ADD}$ are reset to purge the residual charge therefrom (waveforms (a) and (b) in FIG. 3).

The gate driver circuit 19 outputs a gate pulse $\phi GM_{i,j}$ (waveform (e) of FIG. 3), which is applied through the gate wires 16b and the gate matrix section 17 to the first transfer thin film transistors $TMa_{i,j}$ to $TMa_{n,j}$, $TMb_{i,j}$, to $TMb_{n,j}$ . . . . $TMc_{i,j}$ to $TMc_{n,j}$ of the blocks. These transistors are made conductive. The charge is transferred from the en bloc transfer capacitors CT to and stored in the wiring capacitors CL. As a result, a potential V3 at the source of the sequential transfer thin film transistor TM rises as shown by the waveform (g) of FIG. 3 in accordance with the amount of charge transferred to the wiring capacitor CL. The variation of the potential V3 causes the potential on the common signal line 15 to vary. The n number of analog switches (not shown) in the drive ICs 18a, 18b, and 18c are sequentially turned on. Signals time sequentially appear on the output lines 20a, 20b, and 20c of the drive ICs 18a, 18b, and 18c. Specifically, a read signal of the first photo diode $Pa_{1,1}$ of the red-color photo sensing element array 11a in the first block is output from the output line 20a of the drive IC 18a; a read signal of the first photo diode $Pb_{1,1}$ of the green-color photo sensing element array 11b in the first block, from the output line 20b of the drive IC 18b; a read signal of the first photo diode $Pc_{1,1}$ of the blue-color photo sensing element array 11c in the first block, from the output line 20c of the drive IC 18c. The outputting of those read signals from the output lines are concurrently performed. Subsequently, a read signal of the first photo diode $Pa_{2,1}$ of the red-color photo sensing element array 11a in the second block is output from the output line 20a; a read signal of the first photo diode $Pb_{2,1}$ of the green-color photo sensing element array 11b in the second block, from the output line 20b; and a read signal of the first photo diode $Pc_{2,1}$ of the blue-color photo sensing element array 11c in the second block, from the output line 20c. The outputting of those read signals are also concurrently performed. In this way, the read signals of the photo diodes disposed at the corresponding location in the respective blocks are time sequentially read out.

After the output signals of the first photo diodes P in the respective blocks are time sequentially read out, gate pulses $\phi GM_2$ to $\phi GM_n$ are applied to the second to Nth thin film transistors $TMa_{1,2}$ to $TMa_{n,2}$, $TMb_{1,2}$ to $TMb_{n,2}$, . . . , $TMc_{1,2}$ to $TMc_{n,2}$ to $TMa_{1,N}$ to $TMa_{n,N}$, $TMb_{1,N}$ to $TMb_{n,N}$, . . . $TMc_{1,N}$ to $TMc_{n,N}$. Those transistors are made conductive. Consequently, the read signals of the photo diodes P are output from the output lines 20a, 20b, and 20c of the drive ICs 18a, 18b, and 18c.

Thus, in this embodiment, in reading an image, the photo sensing element arrays 11a to 11c successively scan the image in the fast scan direction. In outputting the read image signals, the images signals of the respective colors are discretely output with respect to time, not simultaneously in the fast scan direction. Therefore, when the image reading device of the invention is actually used, a buffer memory is connected to the outputs of the drive ICs 18a, 18b, and 18c. The output signals from the drive ICs 18a, 18b, and 18c are temporarily stored in the buffer memory, thereby obtaining image signals of one line in the fast scan direction. In this case, an original document is fed line by line by means of a document feed means (not shown), such as a roller. Every time the document is fed by one line, the operations of reading and outputting images signals are repeated as described above.

The timings of the pixel data of three colors will be described with reference to FIGS. 9 and 10.

The timing of reading image data every color in the conventional color image reading device will first be described for ease of explanation.

Referring to FIG. 9(b), there is shown the timings of reading color pixel data in the conventional device. The layout of the photo sensing elements of the respective colors in the conventional device is basically equal to that shown FIG. 1. In FIG. 9, Pan,N, Pbn,N, and Pcn,N indicate those indicated by the same symbols in the embodiment of the present invention. In the conventional image reading device, the signals of the first photo sensing element array (corresponding to the photo sensing element array 11a with the filter mounted thereon, which allows only light of red (R) color to pass therethrough in FIG. 1) are read out (during the period GM1 to GMN in FIG. 9(b)). Then, the signals of the second photo sensing element array (corresponding to the photo sensing element array 11b with the filter mounted thereon, which allows only light of green (G) color to pass therethrough in FIG. 1) are read out (during the period GM(N+1) to GM2N). Subsequently, the signals of the third photo sensing element array (corresponding to the photo sensing element array 11c with the filter mounted thereon, which allows only light of blue (B) color to pass therethrough in FIG. 1) are read out (during the period GM(2N+1) to GM3N in FIG. 9(b)). Thus, in the conventional image reading device, pixel data are read out every color in a serial fashion.

In the image reading device of the invention, as shown in FIG. 9(a), the signals of the photo sensing element arrays 11a to 11c are read out in a parallel fashion. During the gate period GM1, a gate pulse φGM is output n times (φGM$_{1,1}$, φGM$_{2,1}$, ..., φGM$_{n,1}$) from the gate driver circuit 19. As a result, the signals of the first photo diodes Pa$_{1,1}$ to Pa$_{n,1}$ of each block are serially read out of the photo sensing element array 11a; the signals of the first photo diodes Pb$_{1,1}$ to Pb$_{n,1}$ of each block are serially read out of the photo sensing element array 11b; and the signals of the first photo diodes Pc$_{1,1}$ to Pc$_{n,1}$ of each block are serially read out of the photo sensing element array 11c. The operation of reading the signals from the photo sensing element arrays 11a, 11b and 11c are concurrently performed (FIG. 9(a)). Subsequently, during the period GM2, a gate pulse φGM is output n times (φGM$_{1,2}$, φGM$_{2,2}$, ..., φGM$_{n,2}$) from the gate driver circuit 19. As a result, the signals of the second photo diodes P of each block are read out as in the previous manner. The similar signal read operation is repeatedly continued until the gate period GMN (FIG. 9(a)). Accordingly, in the image reading device of the invention, the color signal readout time is reduced ⅓ as long as that of the conventional readout method described referring to FIG. 9(b).

The photo sensing element arrays 11a, 11b and 11c are disposed at fixed spatial intervals in the slow scan direction. Therefore, the signals output from the photo sensing element arrays 11a, 11b and 11c at the same output timing are not those of the same location on the original document. When the signals read out at the timings as shown in FIG., 9(a) are simply combined, the resultant image suffers from a so-called inexact superposition of colors. To avoid this problem, the signals output from the photo sensing element arrays 11a, 11b and 11c must be combined in consideration of the difference of the timings of outputting signals from the photo sensing element arrays 11a, 11b and 11c (called a color-register process). A model of this is illustrated in FIG. 10. FIG. 10(a) shows three cycles of output states of the signals from the photo sensing element arrays 11a, 11b and 11c shown in FIG. 9(a). In order to avoid the inexact superposition of colors as described above, a memory circuit (not shown) must be connected to the output of the drive ICs 18a, 18b, and 18c. The signals output at the timing shown in FIG. 10(a) are stored in this memory circuit. The signals are read out of the memory circuit with provision of a time lag based on a relative speed of the photo sensing element arrays 11a, 11b and 11c and an original document (not shown) in the slow scan direction, and those signals are combined. In this embodiment, for the photo sensing element array 11a, the signals during the storage time T1 are combined; for the photo sensing element array 11b, the signals during the storage time T2 are combined; and for the photo sensing element array 11c, the signals during the storage time T3 are combined (interval (a) in FIG. 10(b)). In a color image produced by thus combining the signals, the colors are in perfect resist. Let us consider a case where an original document, not shown, is fixedly placed and the photo sensing element arrays 11a, 11b and 11c are moved in the slow scan direction. In FIG. 10(b), at a time point where the storage time T1 terminates, the photo sensing element array 11b moves to the location where it faces the original. At a time point where the storage time T2 terminates, the photo sensing element array 11c moves to the location where it faces the document. As a result, image signals produced when reading an image on the document in front of the document are obtained. Accordingly, combination of those signals provide color signals free from the inexact superposition of colors as described above.

Another example of the wiring structure for supplying a power source voltage, for example, will be described with reference to FIG. 4. In the figure, PD indicates a photo sensing element array of one block.

In the wiring structure, a first uniform voltage wire 23 interconnects the power source lines of the blocks of the photo sensing element arrays. Second and third uniform voltage wires 24 and 25 interconnect the wires for applying gate pulses φGR and φGT to the thin film transistors TR and TT, respectively (FIG. 4(a)). In the image reading device provided with the uniform voltage wires, the connection of the thin film transistors TR of which the gates are connected forwardly as shown in FIG. 4(b) may electrically and equivalently be expressed as shown in FIG. 4(a). As shown, a plural number of resistors r are inserted in series between the adjacent gates of the transistors, and capacitors are each connected between a node between the resistors r and ground. With the resistors r and the capacitors C thus connected, as the gate pulse goes away from the point where it is applied, the pulse waveform will be more deformed and its amplitude will be smaller. The result is that the thin film transistors, which should be turned on simultaneously, are turned on at different times or some of them are not turned on. In the wiring structure of FIG. 4(a), the resistance of the equivalent resistors R (FIG. 4(b)) of the uniform voltage wires 23 to 25 are relatively smaller than the combined resistance of the resistors r. Therefore, the pulse-waveform deforming problem as just mentioned is solved.

Another source/drain layout of the thin film transistors TT, TR and TM will be described with reference to FIG. 5. A misalignment of the mask alignment that is often caused in the thin film transistor manufacturing stage will change the called overlap capacitance between the gate and drain of the thin film transistor. The change of the overlap capacitance has a great influence on the magnitude of the output signal of the thin film transistor for the following reasons. The overlap capacitance change changes a capacitance of a capacitor connected to the source or the drain and a so-called feed-through voltage as well. The feed-through voltage changes the output value of the thin film transistor. Thus, the change of the overlap capacitance changes the output value of the thin film transistor.

In the construction of the thin film transistors TT, TR, and TM, the source is located on the right side with respect to the gate and the drain is located on the left side (as viewed in FIG. 5), and vice versa. Accordingly, those transistors TT, TR, and TM have eight types of source/drain layout structures (2×2×2). A degree of influence of the source/drain layout structure that is affected to the overlap capacitance depends on the layout structure. In the half of the eight source/drain layout structures, the source and drain are axi-symmetrical with respect to the gate. Accordingly, the source/drain layout structures affecting an influence to the overlap capacitance may be classified into four types of the source/drain layout structures, type 1 to type 4, as shown in FIG. 5. The type 1 of FIG. 5 has two source/drain layout structures (a) and (b) in FIG. 5. In the source/drain layout structure (a), when viewed from the upper side (surface of the paper of FIG. 5) of the substrate on which the thin film transistors TT, TR, and TM are formed, the drains 26a to 26c of these transistors are located on the left side, while the sources 27a to 27c are located on the right side. A wire connecting the source 27a of the thin film transistor TT and the drain 26c of the thin film transistor TM is routed near the source 27b of the thin film transistors TR.

In the source/drain layout structure (b), the drains 26a to 26c of these transistors are located on the right side, while the sources 27a to 27c are located on the left side. A wire connecting the source 27a of the thin film transistor TT and the drain 26c of the thin film transistor TM is routed near the source 27b of the thin film transistors TR.

The two source/drain layout structures are each axis-symmetrical with respect to the line connecting the gates 28a to 28c. Accordingly, those source/drain layout structures have substantially the same influence to the overlap capacitance. The other types 2, 3 and 4 ((c) and (d), ((e) and (f), and (g) and (f)) are all axi-symmetrical.

A test was conducted to confirm the influence of the misalignment of the mask alignment in the thin film transistors TT, TR, and TM to the output values of the transistors. In the test, the sizes of those three transistors was: TT<TR<TM. The four source/drain layout structures shown in FIG. 5 were tested. The results of the test was as shown in FIG. 6.

In the table of FIG. 6, the output variations of the transistors, caused by the variations of the overlap capacitance between the gate and drain, are presented for the four source/drain layout structures. In the output variation in the type 1, the output variation was 2.2 mV for a case where no misalignment exists and the capacitance $C_{GD}$ was 0.085 pF. The output variation 26 mV for another case where a large misalignment exists, i.e., the capacitance $C_{GD}$ was 0.105 in the test of FIG. 6. The output variation −20.3 mV for still another case where a small misalignment exists, i.e., the capacitance $C_{GD}$ was 0.065 in this test. $\Delta V1$ put in the second column from the right side of the table FIG. 6 indicates a difference between a variation of the output value when no misalignment is present and a variation of the output value when the capacitance $C_{GD}$ becomes small due to the misalignment. $\Delta V2$ in the rightmost column indicates a difference between a variation of the output value when no misalignment is present and a variation of the output value when the capacitance $C_{GD}$ becomes large due to the misalignment. In the type 1, $\Delta V1=-22.5$ mV and $\Delta V2=23.8$ mV. As seen from the test results shown in FIG. 6, the output variation in the type 2 (FIGS. 5(c) and 5(d)) is the smallest. In other words, the source/drain layout structure of the type 2 has the smallest influence of the variation of the overlap capacitance caused by the misalignment to the output variation. In FIG. 7, there are illustrated sets of waveforms of a key portion in the source/drain layout structures types 1 to 4 when the misalignment of the mask alignment deviates the output variation of the thin film transistor toward the plus side. Those signal variations will be described with reference to FIG. 7. In the figure, the waveforms indicated by dotted lines are those of the signals when no misalignment is present. The waveforms by soil lines are those of the signals when the output variation is deviated toward the plus side. V1 indicates a potential at the drain of the transfer thin film transistor TT. V2 represents a potential at a node between the transfer thin film transistors TT and TM (FIG. 2). V3 is representative of a source potential of the thin film transistor TM.

Figure 7A:
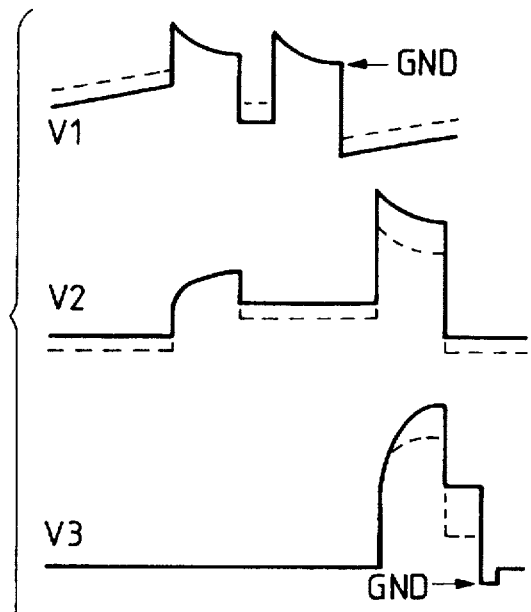
FIGS. 7(a) to 7(d) show sets of waveforms of a key portion in the source/drain layout structures for explaining how the output variation caused by the overlap capacitance depends on the source/drain layout structures of the thin film transistors.
Figure 7B:
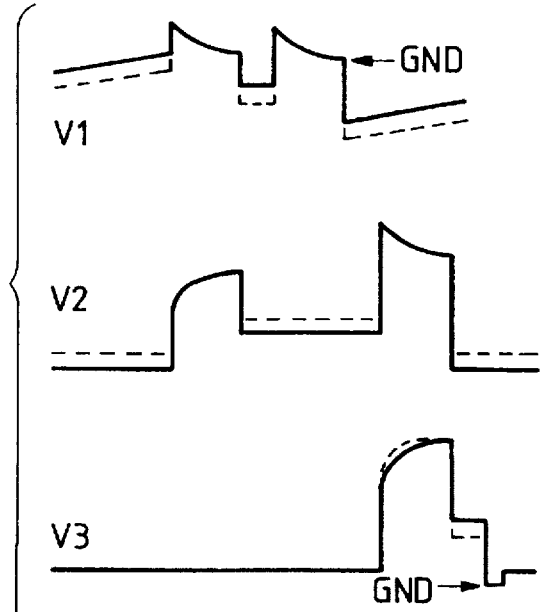
Figure 7C:
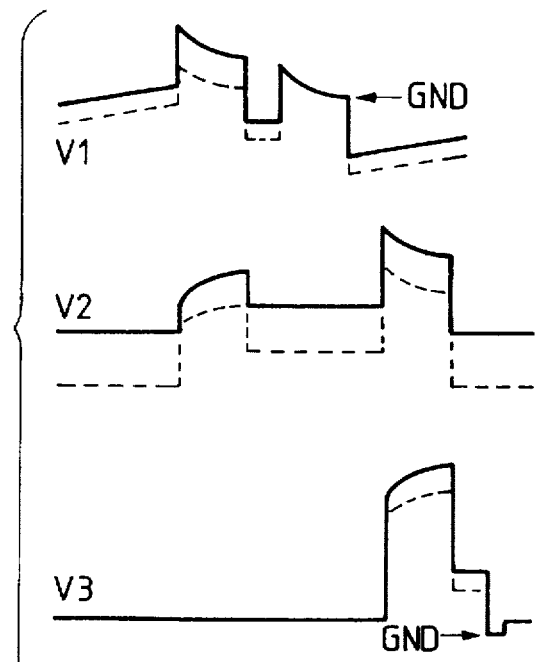
Figure 7D:
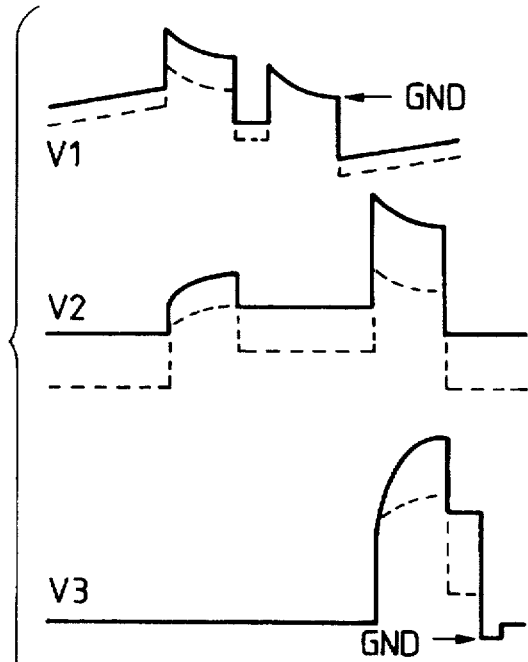
Figure 8:
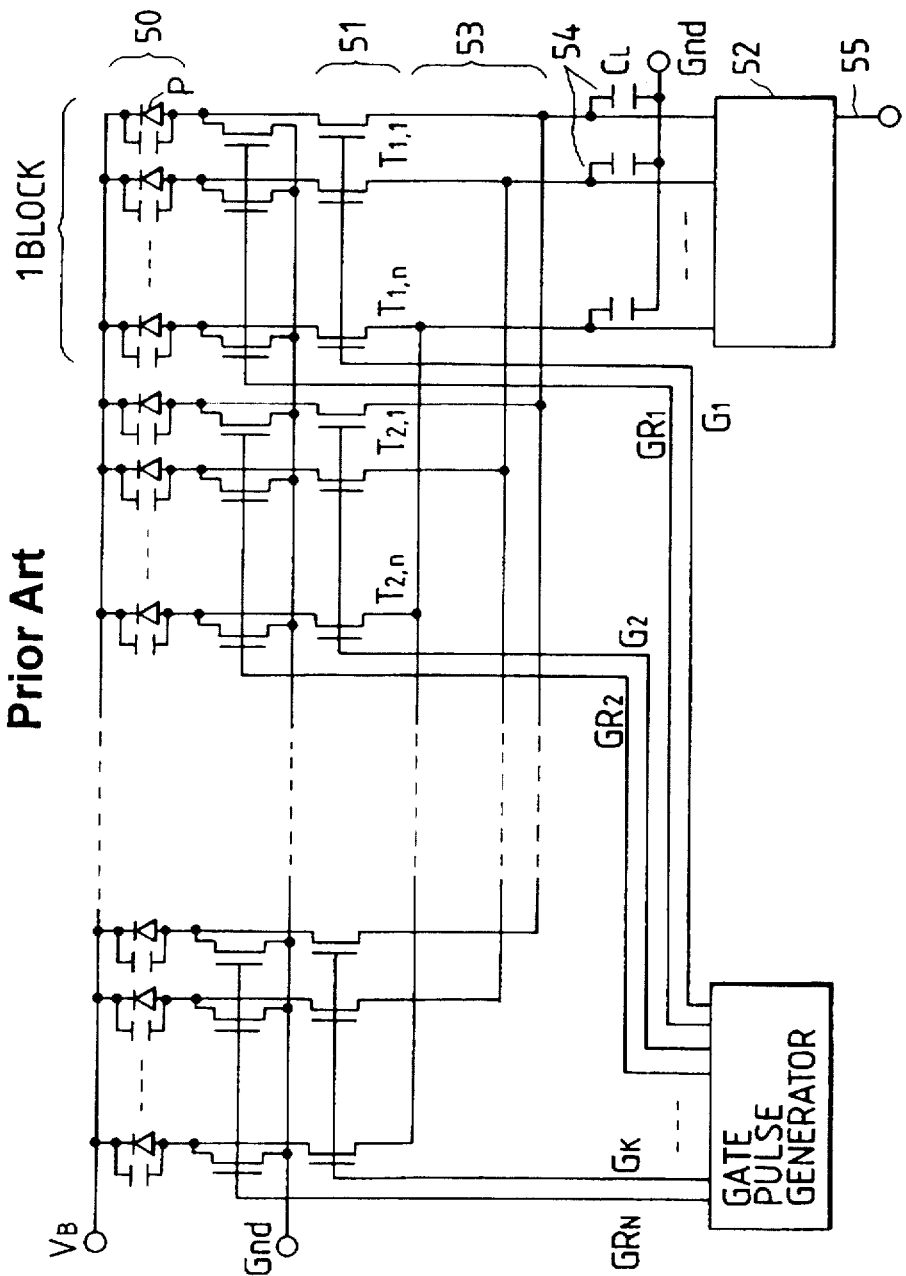
FIG. 8 is a circuit diagram showing a conventional TFT drive image sensor.

FIG. 7(a) shows a set of waveforms of the signals V1 to V3 in the type 1. FIG. 7(b) shows a set of waveforms of the signals V1 to V3 in the type 2. FIG. 7(c) shows a set of waveforms of the signals V1 to V3 in the type 3. FIG. 7(d) shows a set of waveforms of the signals V1 to V3 in the type 4. In the type 1, when the misalignment increases the overlap capacitance closer to the drain of the thin film transistor TT, it will affect some influence to other transistors TR and TM since those transistors are fabricated on the same substrate. Specifically, the capacitance $C_{GD}$ closer to the drain of the thin film transistor TT is increased, and the overlap capacitance by the drain of the thin film transistor TR and the overlap capacitance closer to the thin film transistor TR are also increased. The overlap capacitance closer to the source and the drain of the thin film transistors TT and TR are decreased. With this, the feed-through quantity varies. The result is the variations of the potentials V1 to V3 as indicated by solid lines in FIG. 7(a). The waveform shows that the potential V3 is deviated toward the plus side with respect to the potential when no misalignment is present (indicated by a dotted line in the figure). This phenomena is the same as that referring to FIG. 6 where in the type 1, the output variation is deviated toward the plus side when the capacitance $C_{GD}$ becomes large. The test results of FIG. 6 are supported by this. For other types 2 to 4, the test results of FIG. 6 are similarly supported by the illustrated waveforms.

The capacitor portions simultaneously receive the charges generated in the photo sensing elements, and temporarily store them. The charges stored in the capacitor portions are read out thereof every photo sensing elements disposed at the same location in the blocks. The output signals from the photo sensing elements are output at the same timing in the fast scan direction. The resultant image reader device is free from the read-position shift.

The control signals are supplied always at the same timing. Erroneous operation of the image reader device owing to the control signal supplied at different timings is eliminated. In this respect, the reliability of the device is improved.

The power source voltage applied to the photo sensing elements located near to a point where the photo sensing elements receives the voltage the voltage is applied thereto is substantially equal to that applied to the photo sensing elements located distant from that point. A reliable supply of the power source voltage and a reliable operation of the image reader device are ensured.

The output variations due to the misalignment of the mask pattern in the TFT manufacturing stage are suppressed.

The charges are read out of the photo sensing elements every photo sensing elements disposed at the same location in the blocks. The same signal line may be used for each block. There is no need of the matrix wiring structure, which is essential to the conventional device. No cross-talk is caused among the signal lines. Excellent image signals are ensured.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reader device, comprising:
   at least one photo sensing element array having a plural number of blocks each consisting of plural bits of photo sensing elements, said photo sensing elements generating charges in response to light received during a predetermined time period;
   a plural number of first switching elements, serially connected to respective anodes of said photo sensing elements, for transferring, en bloc, the charges of all bits in said photo sensing element array after said predetermined time period;

a plural number of second switching elements, respectively connected between the anodes of said photo sensing elements and ground, for resetting, en bloc, the charges of all bits left in said photo sensing elements after transferring the charges by said plural number of first switching elements, so that said charges of all bits left in said photo sensing elements are discharged;

a plural number of capacitor portions, connected to said first switching elements, for retaining the transferred charges;

a plural number of third switching elements, connected to said first switching elements and said capacitor portions, for transferring the charges which are stored in said capacitor portions after resetting the charges by said plural number of second switching elements, said third switching elements being grouped into a plurality of groups and being controlled to transfer the charges at timings corresponding to positions in respective groups;

a plural number of wiring capacitor portions, formed in connection with said third switching elements, for retaining the charges transferred by said third switching elements;

a plurality of common signal lines provided for connection to said respective groups of said third switching elements for receiving the charges transferred through said respective groups of said third elements; and drive ICs for receiving the charges through the common signal lines and outputting the charges in the form of image signals.

2. The image reader device according to claim 1, in which each of said first and second switching elements is a thin film transistor having a source electrode, a drain electrode, and a gate electrode, and said gate electrodes of said first switching elements are connected in series for receiving a first common gate voltage, and at least one of said gate electrodes of said first switching element is connected to a first common gate voltage wiring member for receiving said first common gate voltage, further, said gate electrodes of said second switching elements are connected in series for receiving a second common gate voltage, and at least one of said gate electrodes of said second switching element is connected to a second common gate voltage wiring member for receiving said second common gate voltage.

3. The image reader device according to claim 1, in which first terminals of said photo sensing elements are connected in series for receiving a bias voltage, and at least one of said first terminals is connected to a common power supply wiring member for receiving said bias voltage.

4. The image reader device according to claim 1, in which each of said first to third switching elements is a thin film transistor, said thin film transistors of said first to third switching elements arranged in a substantially linear array, source and drain electrodes of said thin film transistors of said first and second switching elements disposed on one side of gate electrodes thereof, and source and drain electrodes of said thin film transistors of said third switching elements disposed on an opposite side of the gate electrodes.

5. The image reader device according to claim 1, wherein each of said third switching elements is a thin film transistor having a gate, and said groups of said third switching elements correspond to said plural number of blocks, further comprising:

gate control lines commonly connected to said third switching elements placed at respective positions within said plural number of blocks.

6. An image device comprising:

image reading means having a plural number of units disposed in parallel, each unit consisting of photo sensing elements for generating charges in response to light received during a predetermined time period, and capacitor portions for retaining the charges;

a plural number of wire capacitor portions for receiving the charges from said capacitor portions;

a plural number of first switching elements, serially connected to respective anodes of said photo sensing elements, for transferring, en bloc, the charges of all bits in said photo sensing elements to said capacitor portions after said predetermined time period;

a plural number of second switching elements, respectively connected between the anodes of said photo sensing elements and ground, for resetting, en bloc, the charges of all bits left in said photo sensing elements after transferring the charges by said plural number of first switching elements, so that said charges of all bits left in said photo sensing elements are discharged;

a plural number of third switching elements, connected to said first switching elements and said capacitor portions, for transferring the charges which are stored in said capacitor portions after resetting the charges by said plural number of second switching elements, said third switching elements being grouped into a plurality of groups and being controlled to transfer the charges at timings corresponding to positions in respective groups; and drive means, connected to said wire capacitor portions, for reading out the charges from said wire capacitor portions.

7. A color image reader device, comprising:

image reading means having a plural number of units disposed in parallel, each unit consisting of photo sensing elements for generating charges in response to light received during a predetermined time period, and capacitor portions for retaining the charges;

a plural number of wire capacitor portions for receiving the charges from said capacitor portions;

a plural number of first switching elements serially connected to respective anodes of said photo sensing elements, for transferring, en bloc, the charges of all bits in said photo sensing elements to said capacitor portions after said predetermined time period;

a plural number of second switching elements, respectively connected between the anodes of said photo sensing elements and ground, for resetting, en bloc, the charges of all bits left in said photo sensing elements after transferring the charges by said plural number of first switching elements, so that said charges of all bits left in said photo sensing elements are discharged;

a plural number of third switching elements, connected to said first switching elements and said capacitor portions, for transferring the charges which are stored in said capacitor portions after resetting the charges by said plural number of second switching elements, said third switching elements being grouped into a plurality of groups and being controlled to transfer the charges at timings corresponding to positions in respective groups; and drive means, connected to said wire capacitor portions, for reading out the charges from said wire capacitor portions.

\* \* \* \* \*